Jan. 26, 1954     A. G. TALBERT     2,667,363
COUPLING FOR TRACTOR AND SEMITRAILER UNITS
Filed March 28, 1950     3 Sheets-Sheet 1
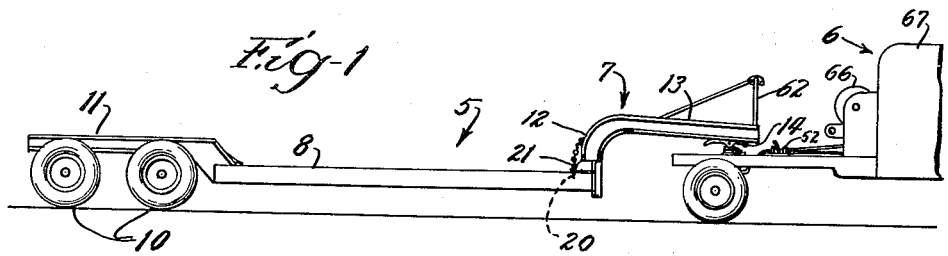
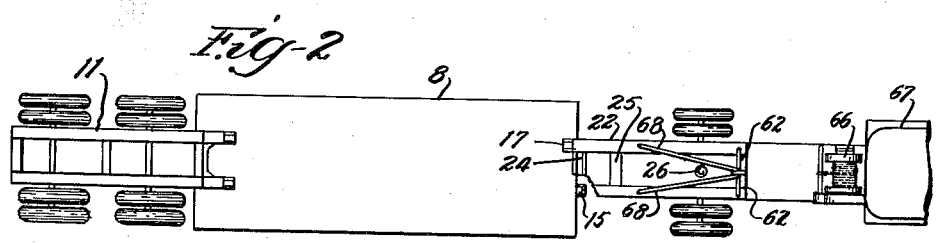
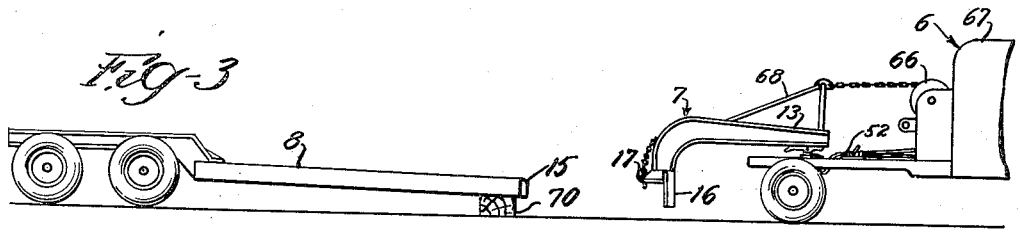
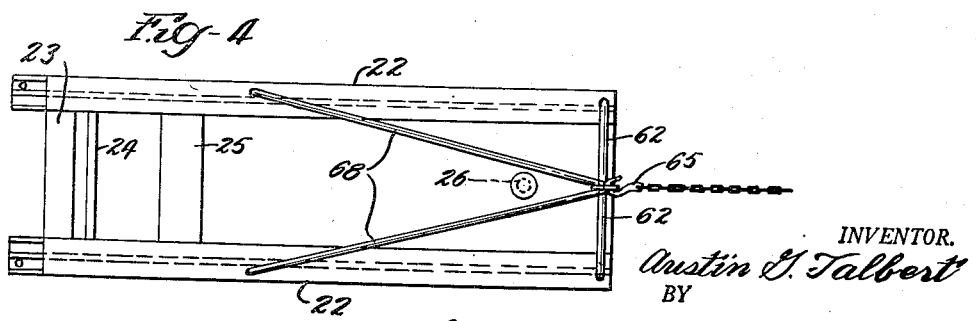
INVENTOR.
Austin G. Talbert
BY
Cromwell, Greist & Warden
Attys.

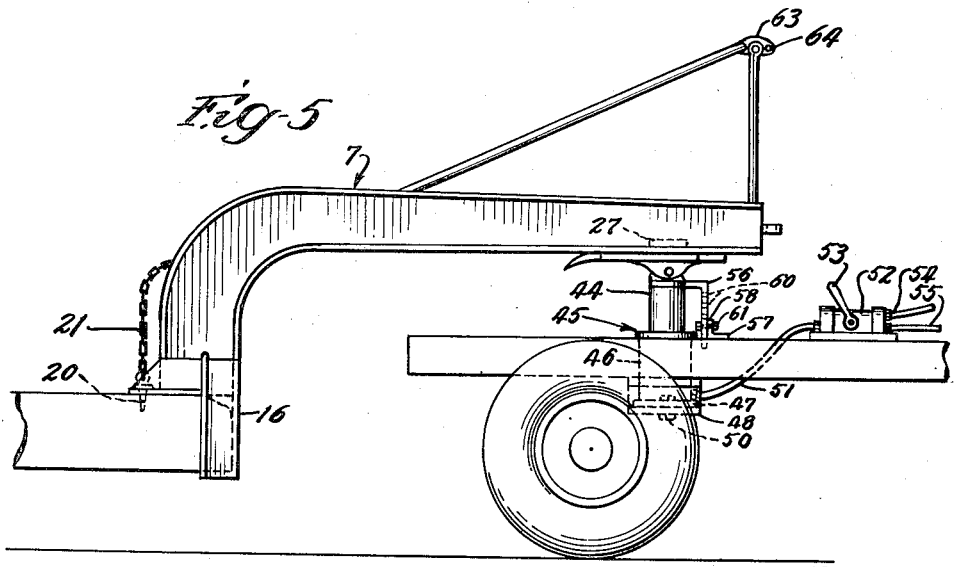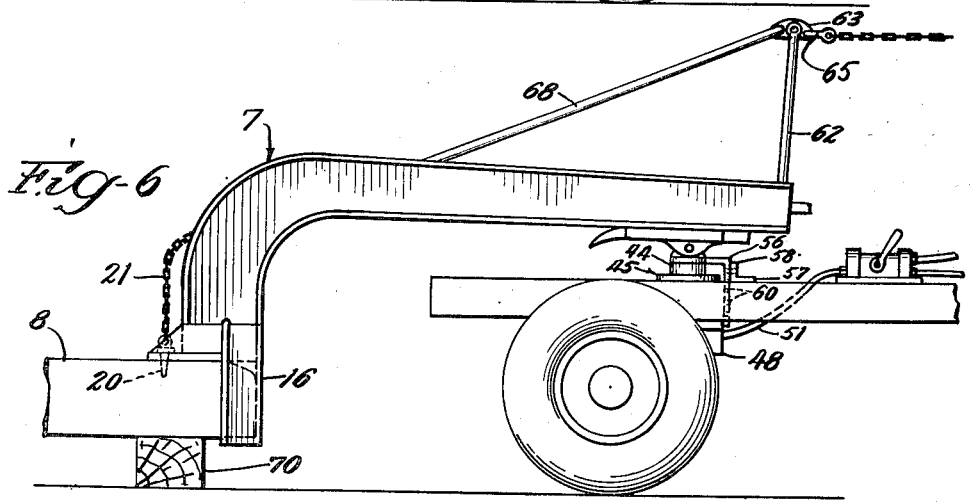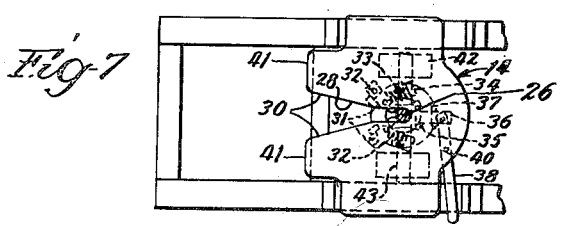

Jan. 26, 1954
A. G. TALBERT
2,667,363
COUPLING FOR TRACTOR AND SEMITRAILER UNITS
Filed March 28, 1950
3 Sheets-Sheet 3
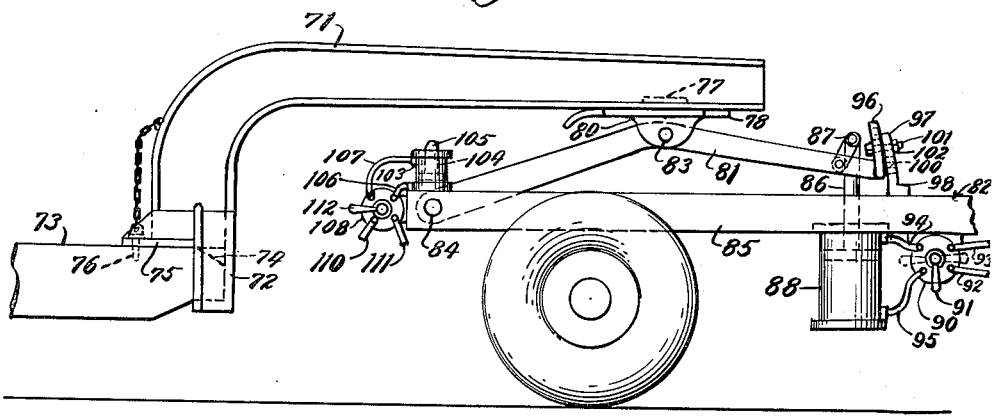
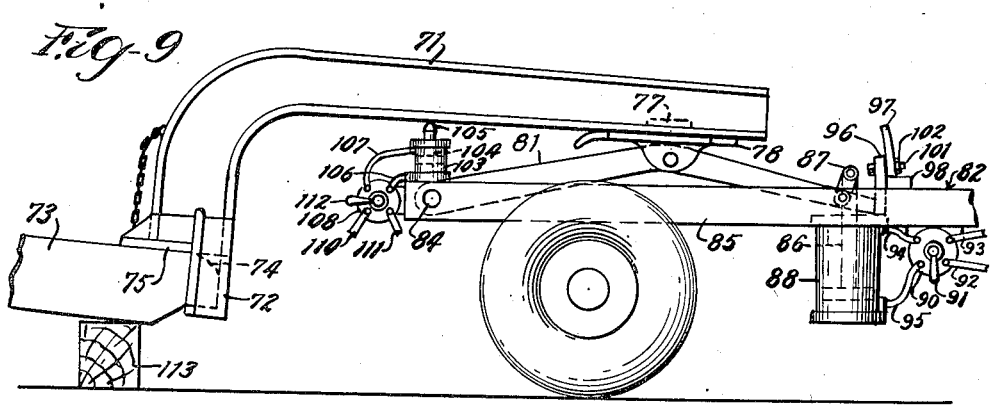
INVENTOR.
Austin G. Talbert
BY
Cromwell, Greist & Warden
Attys.

Patented Jan. 26, 1954

2,667,363

UNITED STATES PATENT OFFICE 2,667,363

COUPLING FOR TRACTOR AND SEMITRAILER UNITS

Austin G. Talbert, Lyons, Ill., assignor to Talbert Construction Equipment Company, Lyons, Ill., a corporation of Illinois Application March 28, 1950, Serial No. 152,393

9 Claims. (Cl. 280—425)

This invention relates, generally, to means for detachably interconnecting the front end of a low-bed, heavy duty trailer having rear support wheels only with a tractor unit through a gooseneck form of drawbar or hitch, and it relates particularly to the provision of a fifth wheel on the tractor which is carried on the lift member of a jack so as to be controllably elevated whereby the gooseneck drawbar unit supported on the fifth wheel may be raised and lowered by the jack mechanism and also tilted.

In my previous Patent No. 2,489,112, granted November 22, 1949, I have disclosed one type of construction which includes a removable gooseneck type drawbar unit associated with a fifth wheel for use in detachably connecting a low-bed, heavy duty trailer unit having rear support wheels only with a tractor. The present invention is directed to a new and different construction for accomplishing the same general purpose.

Low-bed, heavy duty trailers having supporting wheels at the rear end only are in wide use for cross-country transport of heavy machinery such as power shovels, bulldozers, ditchdiggers and other earth working and moving machinery. These low-bed, heavy duty trailers are transported cross-country by highly mobile tractor units with gooseneck type drawbars being used to form a detachable connection between the trailers and the tractors. When it is desired to unload a piece of heavy machinery from one of the low-bed trailers, it is customary to place a timber or other blocking under the front end of the trailer and then to disconnect the gooseneck from the front end of the trailer and pull away with the tractor having the gooseneck attached thereto and supported thereon at its forwardly extending front end. It is not ordinarily practical to block up the front end of the trailer unit in such a way that there is no lowering or settling whatever of this end when the gooseneck is disconnected. Since the trailer body pivots about the rear supporting wheels when the front end is lowered or allowed to settle, it will tilt downwardly a certain amount. Accordingly, in order that the downwardly depending rear end of the gooseneck drawbar unit may be maintained in square relationship or alignment with respect to the front end of the trailer when the latter settles on the blocking, it is necessary for the gooseneck to be correspondingly lowered and tilted.

An important object of the present invention is the combination with a tractor suitable for hauling a low-bed, heavy duty trailer having rear support wheels only of a jack mechanism carrying a fifth wheel for supporting the front end of a gooseneck drawbar, thereby permitting the bottom end of the rear portion of the gooseneck to be brought into square alignment with the front end of the trailer by suitable raising and lowering and tilting, as required. The jack mechanism also may be used on the one hand to elevate the semi-trailer to obtain greater ground clearance, and on the other hand, to lower the semi-trailer to clear low viaducts and other obstacles.

Certain other objects of the invention will, in part, be obvious and will, in part, appear hereinafter.

For a more complete understanding of the nature and scope of the invention, reference may now be had to the following detailed description thereof taken in connection with the accompanying drawings, wherein:

Fig. 1 is a partly diagrammatic, side elevational view, partly broken away, showing a low-bed, heavy duty type trailer unit having rear support wheels only connected by a gooseneck type drawbar unit with a tractor unit having a tiltable fifth-wheel plate carried on a jack mechanism, the equipment being shown in condition for cross-country transport;

Fig. 2 is a top plan view of Fig. 1;

Fig. 3 is a side elevational view showing the tractor and the gooseneck drawbar unit carried thereby in disconnected relationship from the front end of the trailer, the latter being blocked up at the front end;

Fig. 4 is a top plan view on enlarged scale of the gooseneck type drawbar unit;

Fig. 5 is a fragmentary side elevational view on enlarged scale of that portion of Fig. 1 showing the gooseneck drawbar interconnecting the front end of the trailer with the fifth wheel of the tractor for cross-country transport;

Fig. 6 is a side elevational view corresponding to Fig. 5 but showing the gooseneck lowered and forwardly tilted on the fifth wheel so that the rear end of the gooseneck is square with the front end of the trailer which is lowered and tilted down so as to rest on blocking preparatory to detachment of the gooseneck therefrom;

Fig. 7 is a fragmentary top plan view of the fifth-wheel plate carried on the tractor unit;

Fig. 8 is a view corresponding to Fig. 5 showing a desirable modification of the invention; and Fig. 9 is a view of the modification corresponding to Fig. 6.

Referring to Figs. 1–3, reference numeral 5 designates, generally, a low-bed, heavy duty type trailer having rear support wheels only and adapted to be interconnected for cross-country transport by a tractor designated at 6 by means of a gooseneck type of drawbar designated generally at 7. The trailer 5 has a low slung bed or carrying platform 8 supported at its rear end on bogie wheels 10—10 by a rear frame structure 11. The trailer 5 typifies one of several semi-trailer type units in use and available for the purpose of transporting heavy loads cross-country such as heavy earth working machines, e. g. power shovels, bulldozers, ditchdiggers, etc.

Gooseneck type drawbar units have previously been used to detachably interconnect the front end of a semi-trailer with a tractor having a fifth-wheel plate. The gooseneck 7 has a downwardly projecting rear portion 12 and a forwardly extending, generally horizontal, portion 13. The bottom end of the downwardly projecting rear portion 12 is adapted to be rigidly interconnected with the front end of the trailer 5 while the forwardly extending portion 13 is arranged to be supported on, and pivotally connected to, the fifth wheel 14 carried on the tractor 6.

The coupling means for forming a rigid connection between the bottom end of the downwardly projecting rear portion 12 of the gooseneck 7 and the front end of the trailer 5 corresponds, for example, to that described in my aforementioned Patent No. 2,489,112 and does not form a part of the present invention. The bed 8 of the trailer 5 has a pair of spaced male coupling elements or projections 15 mounted on the front end thereof as shown in Figs. 2 and 3. The projections 15 are adapted to fit into socket openings provided therefor in correspondingly spaced apart socket fixtures 16—16 depending from opposite sides or corners of the downwardly projecting portion 12. Adjacent the top of each of the fixtures 16 there is a rearwardly extending plate 17 which is adapted to extend back over and rest on the top of the platform 8 immediately in rear of the respective projections 15, as shown for example in Figs. 2 and 5. The bottom surface of each of the coupling projections 15 rests on the bottom wall of its respective socket fixture 16 when the extension 17 rests on the top surface of the platform 8. This particular arrangement prevents any relative play or tilting between the gooseneck 7 and the trailer 5 and provides a rigid type connection. The connection is secured by a pair of pins 20—20 adapted to fit through a hole in each of the extensions 17 and project into a registering hole in the top of the platform 8 as shown, for example, in Fig. 5. Each of the pins 20 is secured on the gooseneck 7 by a short length of chain 21 attached to the downwardly extending rear portion 12.

The gooseneck 7 may suitably be fabricated from flat steel plate by welding, or it may be built in other ways such as bolting together suitable castings. In the drawings, the gooseneck 7 has two gooseneck-shaped side members 22—22 which are I-shaped in cross section. The members 22—22 are interconnected at the bottom by a floor plate 23 extending from the front to the rear of the gooseneck 7. Cross braces 24 and 25 extend between opposite points on the top flanges of the members 22. A downwardly depending pintle pin 26 (Figs. 4, 5 and 7) is provided on the floor or bottom plate 23 adjacent the front end of the gooseneck 7 and has a head 27 on the top end thereof which is welded to the floor 23. The pintle pin 26 is adapted to be received and locked in the forward end of a slot 28 provided in the fifth wheel 14, as shown in Fig. 7. The slot 28 has outwardly flared sides 30—30 to facilitate entrance of the pintle pin 26 therein. The pintle pin 26 is releasably locked in the position shown in Fig. 7 in the front end of the slot 28 by means of a pair of releasable catches 31—31 forming a part of a known type pintle pin locking mechanism. The catches 31 are pivoted adjacent their rear ends on pins 32—32 and are held or pressed in their locking positions, as shown, by compression springs 33—33 connected at one end to the respective catches 31 and at the other end to respective supporting blocks 34—34 carried on the underside of the fifth-wheel plate 14.

The catches 31 are operated by a fork member 35 having a stem portion 36 which is slidable within a shackle 37 carried on the underside of the fifth-wheel plate 14. The fork 35 is operated by a lever 38 pivotally connected at one end to the fork stem 36 and pivoted intermediate its opposite ends on the underside of the fifth-wheel plate 14 by a pin 40. The outer end of the handle or lever 38 projects to one side of the tractor chassis so that it is accessible to serve as an operating handle. By pushing rearwardly on the handle portion of the lever 38, the fork member 35 is forced forwardly thereby pulling the catches forwardly against the force of the springs 33 so as to release the pintle pin 26 from the forward end of the slot 28.

The fifth-wheel plate 14 is flat except for the rear end portions 41—41 thereof forming the opposite sides of the slot 28, these portions being downwardly turned as shown, for example, in Figs. 5 and 6.

On the underside, the fifth-wheel plate 14 is provided with a pair of spaced apart integral lugs 42—42 which serve to support an axle 43 extending therebetween. The axle 43 projects through an opening provided therefor in the top end of the piston member 44 of a hydraulic jack 45 which is carried on the chassis of the tractor 6 midway between the side rails thereof. The jack 45 has a cylinder 46 having a bottom support flange 47. The cylinder 46 rests on a plate 48 which extends between opposite sides of the tractor chassis and is connected to the bottom surfaces thereof. The cylinder 46 is secured on the support 48 by means of a plurality of bolts 50—50 extending through the flange 47 and the plate 48.

Hydraulic fluid is supplied to the bottom face of the piston 44 through a hose connection 51 attached to the cylinder 46 adjacent its bottom end. The hose 51 is connected with a two-way valve 52 of known type having an operating handle 53. Two conduits or hoses 54 and 55 extend from the valve 52. One of the hoses 54 or 55 is connected to a source of hydraulic fluid under pressure (e. g. a pressure pump driven by the motor of the tractor 6) while the other hose communicates with a receptacle into which the fluid may be vented when the valve 52 is operated so as to release the hydraulic pressure on the underside of the piston 44.

In traveling cross-country, the piston 44 will be in an elevated position as shown, for example, in Fig. 5 and it is desirable that some means be provided for locking the piston in the elevated position so that it will not be necessary to depend upon the hydraulic pressure of the jack 45 for support of the gooseneck 47 and the load transmitted therethrough. Accordingly, an L-shaped bracket member 56 is connected to one side of the piston 44 adjacent the upper end thereof with the downwardly directed leg of the bracket extending past an angle iron 57 supported on the side rails of the trailer chassis and having an upstanding leg 58. The leg 58 has a hole extending therethrough midway between its opposite ends which is adapted to register with any one of the several holes 60—60 provided in the downwardly extending leg of the bracket 56. When the piston 44 is in a raised or elevated position a bolt 61 (Fig. 5) may be inserted through the hole in the leg 58 and a registering hole in the bracket 56 so as to lock the piston in its elevated position and provide a rigid support connection between the fifth-wheel plate 14 and the tractor chassis.

It is apparent that the fifth-wheel 14 as well as the gooseneck 7 supported thereon are tiltable about the axle 43 which extends crosswise of the tractor chassis. In order to control this tilting action and to support the gooseneck 7 in a forwardly tilted position when the rear end is disconnected from the trailer platform 8, a frame structure is provided on the top of the gooseneck 7 comprising a pair of upwardly converging braces 62—62 (Figs. 1 and 2) which at the upper end are attached to opposite sides of a plate 63 provided with an eye 64 for receiving a hook 65 attached to the end of a chain which runs over a winch 66 mounted on the tractor 6 just in rear of the tractor cab 67. The plate 63 is further supported and braced on the top of the gooseneck 7 by a pair of tie rods 68—68 (Figs. 1 and 2) which extend rearwardly from the plate 63 to places of connection on the top flanges of the side members 22.

*Mode of operation*

In Figs. 1, 2 and 5 of the drawings, the gooseneck 7 is shown in the relationship which it has with the tractor 6 and the trailer 5 for cross-country transport. The front end of the platform 8 of the trailer 5 is rigidly connected to the lower end of the downwardly depending rear portion 12 of the gooseneck 7. As explained above, in this rigid inner connected condition, the spaced apart male projections 15 mounted on the front end of the platform 8 fit in and rest on the bottom of the fixtures 16 depending from the lower end of the rear portion 12 of the gooseneck 7, while the rearwardly extending plates 17 fit over and engage the top of the platform 8. The locking pins 20 are inserted in place to maintain this rigid connection.

The piston 44 of the jack 45 is in a raised position and is locked therein by means of the pin or bolt 61 inserted through registering holes in the bracket 56 and the leg 58 of the angle iron 57.

This cross-country transport relationship between the gooseneck 7 and the trailer 5 at the rear end and the tractor 6 at the front end is a conventional one and allows for a tilting or hinge action between the tractor 6 and the trailer 5, and also allows the tractor 6 to pivot or turn with respect to the trailer 5.

Assuming that the trailer 5 is loaded with a piece of heavy machinery, e. g. a power shovel, and it has been delivered to the desired place for unloading, the tractor driver will block up the forward end of the trailer 5 adjacent the rear end of the gooseneck 7 with suitable blocking as indicated at 70 in Figs. 3 and 6. The blocking 63 desirably takes the form of one or several timbers or planks and, as a matter of convenience, these blocks may be carried with the trailer 5 so as to be available for repeated usage. The timber of blocking 70 should have a height such that the front end of the platform 8 will be blocked up to approximately the same height above the ground level which it has during transportation when the platform 8 is approximately level. However, the timber 70 should not have such a thickness that it has to be wedged or forced into place under the front end of the platform 8 since installation and removal of the blocking under such circumstances would be difficult and time-consuming, particularly since very often only the driver of the tractor is available to handle the unloading operation.

Since the front end of the trailer 5 will thus not normally be blocked up to its full height which it has during cross-country transportation, and since there will also usually be some settling of the timber and corresponding settling or lowering of the front end of the platform 8 when the weight of the load is transferred to the blocking 70, provision must be made for both the lowering and forwardly tilting of the gooseneck 7 in order that it may be maintained in square alignment with the front end of the platform 8 during the lowering or settling, thereby permitting it to be easily disconnected and removed without binding. This combined lowering and tilting of the gooseneck 7 is provided for by the tiltable fifth wheel 14 and the jack 45.

After the blocking 70 has been put in place under the front end of the trailer 5, the operator will proceed to remove the locking bolt 61 from the jack mechanism 45 and will connect the cable hook 65 to the eye 64 in the plate 63 and draw up on the winch 66 so as to take up any slack in the cable. The operator now allows the piston 44 to settle and at the same time maintains the cable taut so as to allow the trailer 5 to settle onto the blocking 70 which also results in a lowering of the gooseneck 7 and the forward tilting thereof about the axle 43. When the front end of the platform 8 is fully settled onto the blocking 70, the locking pins 20 will be removed and the operator can pull the tractor away as shown in Fig. 3. The load carried on the trailer 5 may now be removed or unloaded from the front end thereof by letting down suitable planks or other ramp means.

In recoupling or reconnecting the gooseneck 7 to the front end of the trailer 5 which is resting on the blocking 70, it is merely necessary for the driver to back the tractor 6 until the fixtures 16 on the gooseneck 7 are brought into registration with the projections 15, whereupon the locking pins 20 are replaced so as to reestablish the rigid connection between the rear end of the gooseneck 7 and the front end of the trailer 5. Since the gooseneck 7 is continuously maintained in a square relationship with the forward end of the trailer 5, this recoupling can readily be accomplished without adjustments or any wedging.

Once the rigid connection between the bottom end of the gooseneck 7 and the trailer 5 is reestablished, the jack 45 may be operated so as to apply pressure underneath the piston 44 and lift the piston to the point where the platform 8 is brought into an approximately level position. The locking bolt 61 is then put in place and the apparatus is once again in condition for cross-country transport. It will be appreciated that as the piston 44 is being raised it will be necessary to release or pay out the cable from the winch to permit the gooseneck to tilt rearwardly the necessary amount.

Reference may now be had to Figs. 8 and 9 for a description of a modification of the invention described above in connection with Figs. 1-7. This modification incorporates certain features of a highly desirable and useful nature. The modification includes a gooseneck type drawbar 71 which corresponds generally to the gooseneck 7 previously described. However, gooseneck 70 has no superstructure or A-frame mounted on it since a winch is not required for this modification. The socket fixtures 72 may also be somewhat shorter than the corresponding fixtures 16 since the front end of the semi-trailer 73 is provided with coupling projections 74—74 which are undercut at the bottom so as to always be disposed above the ground and thereby accessible for connection in the fixtures 72 even when the front end of the trailer 73 is allowed to rest directly on the ground. The fixtures 72 are provided with rearwardly extending plates 75—75 which fit over the front end of the trailer 73 when it is coupled to the gooseneck 71 as shown. A locking pin 76 fits through an aperture provided therefor in each of the plates 75 and down into a hole in the top of the trailer platform.

The front end portion of the gooseneck 71 has a pintle pin 77 by which the gooseneck may be pivotally connected to a fifth-wheel plate 78 according, for example, to the releasable arrangement shown and described in connection with Fig. 7. The fifth wheel 78 has downwardly projecting spaced lugs 80—80 by which it may be pivotally mounted on the lift member 81 of a jack mechanism carried on the tractor indicated, generally, at 82. An axle rod 83 extends through the lugs 80 and a hole provided in the lift member 81.

The lift member 81 is angled near the center and is fulcrumed at its rear end to the frame of the tractor 82 by means of an axle rod 84 extending through opposite side frame members 85—85 and a hole in the rear end of the member or lever 81. At the front end, the member 81 is pivotally connected by a link 87 to the upper end of a connecting rod 86 of a two-way hydraulic cylinder 88 suitably supported on the frame of the tractor 82.

The cylinder 88 is supplied with hydraulic fluid under pressure from a pump (not shown) carried on the tractor 82 and driven thereby. The fluid comes to the cylinder 88 through a two-way valve 90 of known type having an operating handle 91. The supply line to the valve 90 is designated at 92 while the return line therefrom is designated at 93. The upper end of the cylinder 88 is connected to the valve 90 by a line 94 while a line 95 connects the bottom end of the cylinder to the valve. In one position of the valve handle 91 pressure is applied to the underside of the piston in the cylinder and pressure is released on the upper side thereof, while in the opposite position of the handle, pressure is applied to the top side of the piston and released from the underside thereof. The handle 91 may have a neutral or intermediate position as indicated in full line.

During cross-country travel, the fifth wheel 78 will ordinarily be positioned well above its lowermost position and mechanical interlocking means are provided to lock the fifth wheel in an upper position so that the fifth wheel and the load thereon is not entirely supported by the hydraulic cylinder 88. The interlocking mechanism may take the form of an upwardly extending ear 96 provided on the front end of the lift lever 81 and a cooperating upwardly extending member 97 supported from the tractor frame by a cross member 98. The member 97 is arcuate with a radius of curvature corresponding to the arc defined by the forward end of the member 81. A series of holes 100—100 are provided in the member 97 for receiving a bolt 101 carried by the projection 96. When the fifth wheel 78 is in the desired position of elevation, the bolt may be inserted through one of the holes 100 and secured in place by screwing on a nut 102.

In order to provide for a tilting action for the gooseneck 71 when it is disconnected from the trailer 73, a hydraulic cylinder 103 is provided which is preferably located adjacent the rear end of the chassis of the tractor 82. The connecting rod 104 running to the piston of the cylinder 103 serves to support on its outer end a bar 105 which extends crosswise to the length of the tractor 82 and the gooseneck 71. Hydraulic fluid under pressure is supplied to the bottom side of the piston through a hose coupling 106 and the fluid under pressure is supplied to the upper side of the piston through a hose connection 107. The couplings 106 and 107 communicate with a two-way valve 108 having a pressure inlet line 110 connected therewith and a pressure relief line 110 also connected therewith. Usually, the lines 110 and 111 will communicate with the same fluid pump as the lines serving the hydraulic cylinder 88. The valve 108 has an operating handle 112 which can be turned so as to admit pressure to the underside of the piston or to the upper side thereof, and it also has a neutral position.

*Mode of operation*

The mechanism is shown in its condition for cross-country transport in Fig. 8. As there shown, the fifth wheel and the forward end of the gooseneck 77 are located at an elevation whereat the platform of the semi-trailer unit 73 is approximately horizontal or level. The fifth wheel 78 is tiltable about the axle 83 and the gooseneck 71 is swingable about the pintle pin 77. Accordingly, the conventional hinge and pivot action for a fifth wheel are provided.

Should the units in the course of their cross-country travel come to some obstacle where greater ground clearance for the trailer 73 is required, such as a railroad crossing having abrupt approaches or a road having an unusually high crown, then the locking bolt 101 may be removed and the valve 90 operated so as to raise the lift member 81 to give the desired amount of increased clearance. On the other hand, during the course of travel should it become necessary to lower the trailer platform so as to obtain greater overhead clearance, then the valve 90 would be operated so as to lower the lift member 81 and thereby the gooseneck 71 and the trailer 73 to obtain the desired extent of clearance.

When the units are brought to the location where it is desired to unload the trailer 73, the driver places a timber 113 under the front end of the trailer platform as shown in Fig. 9, removes the interlocking bolt 101, and then operates the valve 90 so as to lower the lift member 81 to the point where the front end of the trailer platform rests on the top of the timber or block 113. The operator then operates the valve 108 so as to extend the piston rod to the point where the bar 105 is brought into engagement with the underside of the gooseneck 71 as also shown in Fig. 9. When these operations have been formed, the locking pins 76 may be removed and the tractor 82 may be pulled away from the trailer 73 so that it may be unloaded from the front end.

With the gooseneck 71 disconnected from the trailer 73 it will be seen that it can be controllably raised, lowered and tilted through proper operation of the valves 90 and 108. For example, with the fulcrum bar maintained at a certain level, the valve 90 may be operated so as to raise or lower the lift member 81, thereby tilting the rear end of the gooseneck 71 either downwardly or upwardly, as desired. In like manner, with the fifth wheel 73 being maintained in a stationary position, the valve 108 may be operated so as to raise or lower the fulcrum bar 105, thereby tilting the gooseneck 71 clockwise or counterclockwise, as desired.

Accordingly, when it is desired to connect the gooseneck 71 to the front end of a semi-trailer, the gooseneck may be elevated and tilted to the exact position required for a square interfitting connection with the forwardly extending projections 74 on the front end of the trailer platform.

The fluid-operated cylinders 88 and 103 serve as jacks for raising and lowering the lift member 81 and the fulcrum member 105, respectively. Mechanically operated or motor driven jacks of known type may be used in place of the cylinders 88 and 103. If it is desired to minimize the cost of equipment, the jack 103 may be eliminated and replaced by a simple block or timber which may be permanently mounted or temporarily inserted when required. Variations in height of the fulcrum may be obtained by adding pieces to or taking pieces away from the blocking.

The lift member 81 serves as a link to connect the fifth wheel 73 to the frame of the tractor 82 and to transmit the pulling load of the trailer to the tractor frame. From the standpoint of mechanical design it is preferable that the pulling load be thus transmitted by the lift member instead of through the cylinder mechanism. The short link 87 connecting the front end of the lever 81 to the piston rod 86 prevents the pulling load from being transmitted to the piston rod and cylinder 88.

Since certain changes and modifications may be made in the embodiment described above in connection with the accompanying drawings, without departing from the spirit and scope of the invention, it is intended that all matter described above or shown in the drawings shall be interpreted as illustrative and not in a limiting sense.

What is claimed as new is:

1. In combination with a tractor for hauling a low-bed heavy duty trailer having rear support wheels only, a winch mounted on said tractor, jack means mounted on said tractor and having a lift member which can be controllably elevated and lowered, a fifth wheel, means attaching said fifth wheel to said lift member so that said fifth wheel is tiltable about an axis extending crosswise of said tractor, a gooseneck type drawbar having a forwardly extending front portion and a downwardly extending rear portion, means for pivotally connecting said gooseneck front portion to said fifth-wheel plate, coupling means on said rear portion adapted to cooperate with complementary coupling means on the front end of said trailer for rigidly connecting the latter to said drawbar, and frame means extending above said drawbar providing a place of connection for a cable, chain, rope or the like running from said winch.

2. The combination of claim 1 wherein there is locking means on said lift member and said tractor whereby said lift member may be locked in any one of a plurality of elevated positions and supported by said tractor.

3. The combination with a tractor of the type adapted to support and pull the front end of a semi-trailer through an interposed gooseneck detachably connected with the trailer, of a forwardly and rearwardly tiltable fifth wheel on the tractor to which the gooseneck is adapted to be pivotally connected, manually operable means on the tractor for bodily raising and lowering the fifth wheel, and other manually operable means on the tractor adapted to be connected with the gooseneck rearwardly of said fifth wheel for adjustably supporting the latter against rearward tilting movement at various elevations of the fifth wheel when the gooseneck is disconnected from the trailer.

4. In combination with a tractor for hauling a low-bed heavy duty trailer having rear support wheels only, jack means mounted on said tractor having a lift member which can be controllably elevated and lowered, a fifth wheel, means attaching said fifth wheel to said lift member whereby said fifth wheel is tiltable about an axis extending crosswise of said tractor, a gooseneck type drawbar having a forwardly extending front portion and a downwardly extending rear portion, means for pivotally connecting said gooseneck front portion to said fifth-wheel plate, coupling means on said rear portion adapted to cooperate with complementary coupling means on the front end of said trailer for rigidly connecting the latter to said drawbar, manually operable jack means mounted on said tractor at a location rearwardly of said fifth-wheel plate, and fulcrum means supported on the lift member of said jack means supportably engaging said gooseneck rearwardly of said fifth-wheel plate.

5. In combination with a tractor for hauling a low-bed heavy duty trailer having rear support wheels only and adapted to be detachably connected to the tractor by a gooseneck type drawbar, jack means mounted on said tractor and having a lift member in the form of a bell crank lever pivotally connected adjacent the rear end thereof to the tractor frame and pivotally connected adjacent the front end thereof to the moving member of said jack means, and a fifth wheel pivotally mounted on said bell crank lever at approximately the intersection of the two legs thereof so as to be tiltable around an axis extending crosswise of said truck, said fifth wheel serving to support said drawbar adjacent the front end thereof.

6. The combination with a tractor of the type adapted to support and pull the front end of a semi-trailer through an interposed gooseneck detachably connected with the trailer, of a forwardly and rearwardly tiltable fifth wheel on the tractor to which the gooseneck is adapted to be pivotally connected, manually operable means on the tractor for bodily raising and lowering the fifth wheel, and a winch mounted on said tractor having a cable, chain, rope or the like running from the winch to a place of connection on said gooseneck located substantially above said fifth wheel.

7. The combination with a tractor of the type adapted to support and pull the front end of a semi-trailer through an interposed gooseneck detachably connected with the trailer, of a forwardly and rearwardly tiltable fifth wheel on the tractor on which the front portion of the gooseneck is adapted to be flatly supported and to which the front portion of the gooseneck is adapted to be pivotally connected in said flatly supported position, power-operated means mounted on the tractor and connected with the fifth wheel for bodily lowering and raising the fifth wheel relative to the tractor, whereby to correspondingly lower or raise the gooseneck when the latter is supported on the fifth wheel and at the same time allow the gooseneck with the fifth wheel to tilt forwardly or rearwardly as a unit while being lowered or raised, and other power-operated means mounted on the tractor and operatively connected with the gooseneck when the latter is supported as aforesaid on the fifth wheel for supporting the gooseneck against further movement in any angular position relative to the tractor into which the gooseneck may be tilted when the fifth wheel is lowered, whereby to permit the gooseneck to be detached from the trailer and subsequently brought back into realignment with the same without removing the gooseneck from the fifth wheel.

8. The combination with a tractor of the type adapted to support and pull the front end of a semi-trailer through an interposed gooseneck detachably connected with the trailer, of a forwardly and rearwardly tiltable fifth wheel on the tractor on which the front portion of the gooseneck is adapted to be flatly supported and to which the front portion of the gooseneck is adapted to be pivotally connected in said flatly supported position, power-operated means mounted on the tractor and connected with the fifth wheel for bodily lowering and raising the fifth wheel relative to the tractor, whereby to correspondingly lower or raise the gooseneck when the latter is supported on the fifth wheel and at the same time allow the gooseneck with the fifth wheel to tilt forwardly or rearwardly as a unit while being lowered or raised, and other power-operated means mounted on the tractor and operatively connected with the gooseneck when the latter is supported as aforesaid on the fifth wheel for supporting the gooseneck against further movement in any angular position relative to the tractor into which the gooseneck may be tilted when the fifth wheel is lowered, whereby to permit the gooseneck to be detached from the trailer and subsequently brought back into realignment with the same without removing the gooseneck from the fifth wheel, said last mentioned power-operated means being also operable to tilt the gooseneck forwardly or rearwardly beyond said above-mentioned lowered position.

9. The combination with a tractor of the type adapted to support and pull the front end of a semi-trailer through an interposed gooseneck detachably connected with the trailer, of fifth-wheel means on the tractor to which the front end of said gooseneck is adapted to be connected so as to be both swingable in a horizontal plane and tiltable in a vertical plane with respect to the tractor body, power-operated means mounted on the tractor and connected with said fifth-wheel means for bodily lowering and raising the fifth-wheel means relative to the tractor body so as to simultaneously raise or lower the front end of said gooseneck, and second power-operated means mounted on the tractor adapted to be operatively connected with the gooseneck when the latter is connected with said fifth-wheel means for both supporting the gooseneck in any position into which it may be tilted and for controllably tilting the gooseneck into any desired position.

AUSTIN G. TALBERT.

References Cited in the file of this patent
UNITED STATES PATENTS

| Number | Name | Date |
|---|---|---|
| 1,908,987 | Kuhlman | May 16, 1933 |
| 2,223,650 | Weber | Dec. 3, 1940 |
| 2,350,841 | Troche et al. | June 6, 1944 |
| 2,482,868 | Pollard | Sept. 27, 1949 |
| 2,489,112 | Talbert | Nov. 22, 1949 |